United States Patent [19]

Gilbert

[11] Patent Number: 4,598,915
[45] Date of Patent: Jul. 8, 1986

[54] GASKET SEAL BETWEEN SEWER PIPE AND MANHOLE OPENING

[76] Inventor: Noël Gilbert, 282-14e Ave., La Guadeloupe, Quebec, Canada, G0M 1G0

[21] Appl. No.: 795,233

[22] Filed: Nov. 5, 1985

[51] Int. Cl.$^4$ .................. F16J 15/10; F16J 15/32; F16L 21/02

[52] U.S. Cl. .................. 277/207 A; 277/166; 277/152; 277/DIG. 2; 285/230; 285/345

[58] Field of Search .......... 277/152, 153, 166, 207 R, 277/207 A, DIG. 2; 285/110, 230, 231, 345

[56] References Cited

U.S. PATENT DOCUMENTS

| | | |
|---|---|---|
| 3,315,971 | 4/1967 | Sakurada . |
| 3,787,061 | 1/1974 | Yoakum .................. 277/207 A X |
| 4,143,884 | 3/1979 | Nicholas et al. . |
| 4,159,829 | 7/1979 | Ditcher .................. 277/207 A X |
| 4,342,462 | 8/1982 | Carlesimo .................. 277/207 A X |
| 4,350,351 | 9/1982 | Martin .................. 285/230 X |
| 4,508,355 | 4/1985 | Ditcher .................. 277/207 A X |

FOREIGN PATENT DOCUMENTS

| | | |
|---|---|---|
| 10739382 | 3/1980 | Canada . |
| 10776922 | 5/1980 | Canada . |
| 1085889 | 9/1980 | Canada . |
| 1100547 | 5/1981 | Canada . |
| 11124682 | 11/1981 | Canada . |
| 1169837 | 6/1984 | Canada . |
| 11913622 | 8/1985 | Canada . |

Primary Examiner—Robert S. Ward

[57] ABSTRACT

An annular gasket is provided to provide a leak proof seal between the surface of an opening through the wall of a manhole and the outer surface of a pipe which passes through said opening. The gasket is made of elastomeric material and has a cross-section defining a radially outward T-shape portion embedded in the concrete of the manhole wall around the opening. The gasket further includes a radially inner enlargement tapering radially inwardly and terminated by a laterally directed lip. The enlargement and lip are flexed by the pipe inserted through the opening with the maximum thickness of the enlargement forming a sealing ridge contacting the pipe in a first zone and with the lip also contacting the pipe in a second zone with a void between the first and second zones. The surface of the manhole opening has a channel for receiving the anchoring part of the gasket and on each side of the channel two frusto-conical surface portions of different minimum diameter; the frusto-conical surface portion of lesser minimum diameter being disposed on the side of the lip and acting as a solid stop for the pipe when subjected to abnormally high shearing force so that the portion of the gasket diametrically opposite said stop will not disengage the pipe.

7 Claims, 4 Drawing Figures

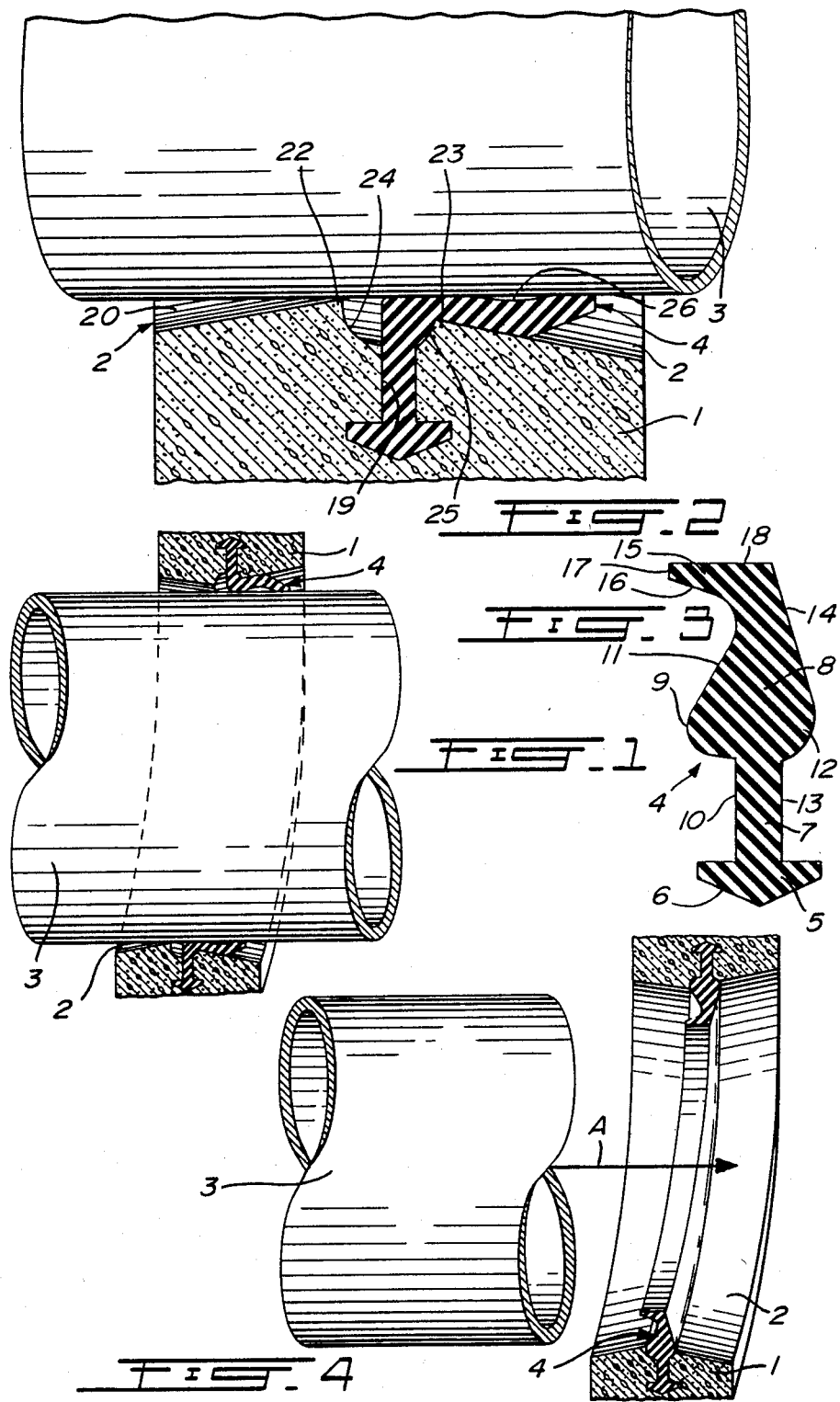

GASKET SEAL BETWEEN SEWER PIPE AND MANHOLE OPENING

The present invention relates to a gasket seal between a sewer pipe and a manhole opening.

BACKGROUND OF THE INVENTION

Gaskets of the above-mentioned type, of which there are several known designs (see for instance Canadian Patent No. 971,997 dated July 29, 1975, and Canadian Patent No. 1,073,938 dated March 18, 1980, both to John Ditcher and entitled GASKET SEAL BETWEEN SEWER PIPE AND MANHOLE OPENING and MOLDED PLEATED GASKET respectively) have certain disadvantages, inter alia the following:

(a) they allow only very limited inclination of the sewer pipe with respect to its normal axis perpendicular to the plane of the manhole opening;

(b) they do not seal completely around the pipe when the latter is subjected to an abnormally high shearing stress;

(c) the pipe once inserted into the manhole opening often cannot be withdrawn for inserting its outer end into the bell-shaped spigot connection of the adjacent sewer pipe without breakage of the gasket;

(d) a poor seal often effected around the pipe due to surface irregularities of the pipe surface.

OBJECTS OF THE INVENTION

It is therefore the general object of the present invention to provide a gasket of the character described which effects a seal at two longitudinally spaced zones around the pipe to effect a double seal.

Another object of the present invention is to provide a gasket of the character described which permits an important inclination of the pipe within the manhole opening without destroying the sealing effect of the gasket.

Another object of the present invention resides in a gasket of the character described which allows the pips to be shifted in both axial directions with respect to the gasket without damaging the latter.

Another object of the invention is to provide an assembly of a wall having an opening for receiving a pipe with the surface of the wall opening being non-symmetrical on each side of the gasket so as to form a step to positively limit lateral displacement of the pipe under abnormally high shearing force so as to provide a good seal around the pipe even under such a force.

SUMMARY OF THE INVENTION

There is provided an annular elastomeric gasket for resiliently supporting a sewer pipe in a manhole opening and sealing the space between the opening surface and the surface of the pipe, said gasket when in unstressed state having an outer cylindrical flange member extending axially on both sides of a midplane which is normal to the axis of the pipe, a web extending radially inwardly from a midregion of the inner surface of said cylindrical flange member and integral therewith, said web and said flange being adapted for embedment in settable material lining the manhole opening, an enlargment extending radially inwardly from said web forming a sealing ridge proximate to said web which laterally protrudes from one side face of said web, said enlargment defining a generally flat lateral surface merging with said sealing ridge and radially inwardly extending therefrom and tapering from said ridge towards said midplane, and a sealing lip depending from the radially inner end portion of said enlargment, extending at generally right angle to said midplane and laterally protruding from said lateral surface, said lip having a lateral surface joining at an angle with the lateral surface of said enlargment, said lip having an inner diameter substantially less than the outer diameter of said pipe, said sealing ridge and said sealing lip adapted to contact the external surface of the pipe at two axially spaced zones with said two lateral surfaces defining an annular void therebetween.

The invention also contemplates as a new article of manufacture the combination of the gasket with its cylindrical flange member and web embedded in a channel formed at the opening surface with said opening surface defining two frusto-conical surface portions extending on opposite sides of the channel and web with a first frusto-conical surface portion disposed on the side of said lip and sealing ridge and having a minimum diameter which is less than the minimum diameter of the other frusto-conical surface portion.

BRIEF DESCRIPTION OF THE DRAWINGS

FIG. 1 is a vertical cross-section of a manhole wall showing a sewer pipe inserted through the manhole opening and sealed by the annular gasket of the invention;

FIG. 2 is a partial section as in FIG. 1, on an enlarged scale;

FIG. 3 is a cross-section of the gasket in unstressed state; and

FIG. 4 is a cross-section of the assembly of FIG. 1 and showing the sewer pipe about to be inserted within the manhole opening.

DETAILED DESCRIPTION OF THE DRAWINGS

As shown in FIG. 1, a manhole wall 1 is provided with an opening 2 in which is inserted a sewer pipe 3. An annular gasket 4 of elastomeric material has a radially inner portion anchored in the settable material such as concrete constituting the manhole and a radially innermost portion adapted to be flexed upon insertion of the sewer pipe and form a tight seal around the external surface of said pipe 3. The gasket 4 when seen in cross-section and in unstressed condition has the shape shown in FIG. 2, more particularly, and has a generally cylindrical radially innermost flange 5 which is adapted to extend axially on both sides of a midplane which is normal to the axis of the pipe 3. This flange member 5 may have a flat radially innermost surface 6 or a pointed surface as shown in FIG. 2. The gasket 4 further includes a web 7 radially inwardly extending from the flange member 5 and connected to the midregion of the flange member 5. A bulbular, preferably pear-shape enlargement 8 is integrally connected to the radially inner end of the web 7 and forms a sealing ridge 9 proximate to the web 7 and which laterally protrudes from a side face 10 of web 7. Enlargement 8 further defines a generally flat lateral surface 11 which merges with the preferably curved ridge 9 and which radially inwardly extends therefrom and tapers from said ridge 9 towards the above noted midplane. Enlargement 8 also preferably has a portion 12 proximate to web 7 which protrudes laterally from the opposite side face 13 of web 7, portion 12 being somewhat rounded and being extended by a flat lateral surface 14 opposite to lateral surface 11 and also radially inwardly converging towards said midplane.

A sealing lip 15 depends from the radially inner end portion of the enlargement 8 and extends at generally right angle to the above-noted midplane and laterally protrudes from the lateral surface 11. Sealing lip 15 has a lateral surface 16 which joins with the lateral surface 11 and makes a generally right angle therewith. Preferably, the outer end face 17 of the sealing lip 15 protrudes laterally from the sealing ridge 9. End face 17 is generally parallel to the above-noted midplane while the radially inner end face 18 of the lip 15 forms a generally cylindrical surface normal to said midplane. The annular gasket 4 is held in position while the concrete is being poured to form a manhole section by means of a two-part shaping element (not shown) so that the wall opening 2 is formed and, at the same time, the flange member 5 and the web 7 become anchored in a matching channel 19 made in the cementitious material of the manhole wall 1. Each shaping element also serves to shape the surface of the wall opening 2 in such a manner as to provide two oppositely directed wall opening surface portions 20 and 21 disposed on each side of the gasket 4 and each of generally frusto-conical shape and flaring away from the gasket. The frusto-conical surface portion 20 disposed on the side of the gasket from which lip 15 and ridge 19 protrude has a minor diameter indicated at 22 which is smaller then the minor diameter of the other frusto-conical surface 21 which is indicated at 23. The difference of diameters between minor diameters 22 and 23 is equal to about one-third of the maximum thickness of the enlargement 8. The surface portion of minor diameter 22 has a smaller diameter than that of the sealing ridge 9 so that the latter is nested within an enlarged radially innermost portion of the channel 19 as shown in full line in FIG. 2 and indicated at 24 when the gasket is in unstressed or unflexed condition.

Starting from the part having the minor diameter 23 towards the channel 19, the surface of the wall opening gradually increases in diameter as shown at 25 to accommodate portion 12 of the enlargement 8 during flexing of the gasket.

As shown in FIG. 4, the sewer pipe 3 is inserted through the manhole opening 2 in the direction of arrow <<A>>, i.e. from the outside of the manhole and the sealing ridge 9 and sealing lip 15 are oriented towards the outside of the manhole. Therefore, they face the incoming sewer pipe.

As shown in FIG. 4, with a gasket in unstressed unstressed condition, the radially innermost portion of the gasket has a much lesser diameter than the external diameter of the sewer pipe 3. The inner end of the sewer pipe strikes against the lateral surface 11 of the gasket and flexes the gasket towards the central axis of the manhole, the sealing lip 15 then projects radially inwardly and abuts the inner end of the sewer pipe which strikes against the lateral surface 16 of the sealing lip 15 causing outward flexing of the same whereby said lateral surface 16 comes in contact with the outside surface of the sewer pipe as well as a sealing ridge 9 with a void 26 disposed therebetween as clearly shown in FIG. 2 and the pipe is fitted to its final position within the manhole opening 2. There are also provided two sealing zones axially spaced along the pipe 3 and the lip 15 being flexed exerts a good sealing pressure all around the pipe.

Because of the relatively important length of the flexed part of the gasket and because of the flat lateral surfaces 11 and 16 and flattened ridge 9 engaging the gasket, it has been found that the pipe can be longitudinally shifted outwardly of the manhole, i.e. in a direction reverse to the direction of arrow <<A>> without in any way breaking the gasket because the same simply slides on the sewer surface. Thus, this enables to insert the outer end of the sewer pipe 3 into the bell-shaped spigot connection of the already laid next sewer pipe of a sewer line, without having to displace the manhole.

Under a normal shearing stress exerted on the sewer pipe 3, for instance due to ground and/or traffic loading, the enlargement 8 is compressed to such an extent that there will remain a gap between the pipe and the portion of minor diameter 22. If this shearing force becomes abnormally high, the pipe will simply come to rest on the portion of minor diameter 22 which acts as a stop and which is such that the sealing lip 15 at its part which is diametrically opposed to the direction of the shearing force will still fully contact and make a seal with the corresponding surface portion of the sewer pipe 3. Thus, no leakage can develop even under those conditions. Because of the provision of the lip 15, it has been found that the sewer pipe can be inclined at a relatively large angle with respect to its normal position perpendicular to the axis of the manhole without causing leakage of the seal.

What I claim is:

1. An annular elastomeric gasket for resiliently supporting a sewer pipe in a manhole opening and sealing the space between the wall of the opening and the surface of the pipe, said gasket, when in unstressed state, having an outer cylindrical flange member extending axially on both sides of the midplane which is normal to the axis of the pipe, a web extending radially inwardly from a mid-region of the inner surface of said cylindrical flange member and integral therewith, said web and said flange being adapted for embedment in settable material lining the manhole opening, an enlargment extending radially inwardly from said web and integral therewith, forming a sealing ridge proximate to said web and which laterally protrudes from one side face of said web, said enlargment defining a generally flat lateral surface merging with said sealing ridge and radially inwardly extending therefrom and tapering from said ridge toward said midplane, and a sealing lip depending from the radially inner end portion of said enlargment, extending at generally right angle to said midplane and laterally protruding from said lateral surface, said lip having a lateral surface joining at an angle with the lateral surface of said enlargment, said lip having an inner diameter substantially less than the outer diameter of said pipe, said sealing ridge and said sealing lip adapted to contact the external surface of said pipe at two axially spaced zones with said two lateral surfaces defining an annular void therebetween.

2. The gasket of claim 1 wherein said two lateral surfaces join at substantially a right angle.

3. The gasket of claim 2, wherein said lip protrudes from said one side face of said web to a greater extent than said sealing ridge.

4. The gasket of claim 3, wherein said enlargment also laterally protrudes from the opposite side face of said web.

5. As a new article of manufacture, a wall of settable material having an opening, the peripheral surface of which has a peripheral channel in which the cylindrical flange member and web of the gasket of claim 4 are embedded and first and second frusto-conical surface portions extending on opposite sides of said channel and web, with said first frusto-conical surface portion disposed on the side of said lip and sealing ridge and having a minimum diameter which is less than the minimum diameter of the second frusto-conical surface portion.

6. The article of manufacture defined in claim 5, wherein the minimum diameter of said first frusto-conical surface portion is less than the diameter of said sealing ridge, but more than the inner diameter of said lip.

7. The article of manufacture defined in claim 6, wherein the difference of minimum diameters of said first and second frusto-conical surface portions is equal to about one-third the maximum thickness of said enlargment, such that said sealing ridge normally protrudes radially inwardly from said first frusto-conical surface portion when said gasket is flexed by a pipe inserted within said gasket with said sealing ridge and sealing lip contacting the surface of said pipe under a normal shearing force exerted on said pipe, said pipe, when subjected to a higher shearing force, coming to rest against said first frusto-conical surface portion at a part of said wall opening towards which said shearing force is directed and preventing the part of said gasket diametrically opposed to said wall opening part from disengaging said pipe surface.

* * * * *